United States Patent
Gregg et al.

(10) Patent No.: US 12,435,835 B2
(45) Date of Patent: Oct. 7, 2025

(54) SCREEN ASSEMBLY

(71) Applicant: Caterpillar Inc., Peoria, IL (US)

(72) Inventors: Thomas J. Gregg, Decatur, IL (US); Sanjeev Kumar, Chennai (IN); Bryan Warren Rickards, Peoria, IL (US); Keith A. Kabrick, Harrison, TN (US); Michael Slovak, Dunap, IL (US); Nirmal Pavangat, Peoria, IL (US); Naveen Deivasigamani, Chennai (IN)

(73) Assignee: Caterpillar Inc., Peoria, IL (US)

( * ) Notice: Subject to any disclaimer, the term of this patent is extended or adjusted under 35 U.S.C. 154(b) by 544 days.

(21) Appl. No.: 17/889,657

(22) Filed: Aug. 17, 2022

(65) Prior Publication Data

US 2024/0060601 A1      Feb. 22, 2024

(51) Int. Cl.
F16N 39/06      (2006.01)
B01D 29/01      (2006.01)
(Continued)

(52) U.S. Cl.
CPC ............ *F16N 39/06* (2013.01); *B01D 29/01* (2013.01); *B01D 35/06* (2013.01); *B60B 35/125* (2013.01);
(Continued)

(58) Field of Classification Search
CPC ......... B01D 29/01; B60B 35/00; B60B 35/06; B60B 35/16; B60B 35/125; F16N 39/06;
(Continued)

(56) References Cited

U.S. PATENT DOCUMENTS 2,890,754 A * 6/1959 Hoffstrom ............... E21B 36/02
                                                      126/91 A
3,485,376 A * 12/1969 Peterson ................. B01D 33/23
                                                      210/486
(Continued)

FOREIGN PATENT DOCUMENTS

CN      203431146 U      2/2014
CN      208842151 U      5/2019
(Continued)

OTHER PUBLICATIONS

Perforated Plate vs. Woven Wire Mesh Filters: Which Is Best For Me? Badger, Sam https://blog.wstyler.com/filters/perforated-plate-vs-woven-wire-mesh-filters Jun. 25, 2021 (Year: 2021).*
(Continued)

*Primary Examiner* — S. Joseph Morano
*Assistant Examiner* — Eva L Comino
(74) *Attorney, Agent, or Firm* — Harrity & Harrity LLP; Jeff A. Greene

(57) ABSTRACT

In some implementations, a screen assembly may include at least one plate member having at least one opening; a screen, that is fluid permeable, disposed on the at least one plate member to expose the screen via the at least one opening; an aperture through the at least one plate member and the screen to receive an axle shaft; a notch extending inwardly from an outer edge of the screen assembly to provide a passage for a fluid conduit; and at least one magnet disposed on the at least one plate member.

20 Claims, 3 Drawing Sheets

(51) Int. Cl.
  *B01D 35/06* (2006.01)
  *B60B 35/12* (2006.01)
  *B60B 35/16* (2006.01)
  *F16H 57/02* (2012.01)

(52) U.S. Cl.
  CPC .... *B60B 35/16* (2013.01); *F16H 2057/02052* (2013.01)

(58) Field of Classification Search
  CPC ............. F16H 57/0404; F16H 57/0483; F16H 2057/02052
  See application file for complete search history.

(56) References Cited

U.S. PATENT DOCUMENTS

| | | | | |
|---|---|---|---|---|
| 3,502,176 | A * | 3/1970 | Terry | F16H 57/0483 184/6.24 |
| 4,446,017 | A * | 5/1984 | Oberg | B01D 35/143 210/90 |
| 5,399,265 | A * | 3/1995 | Nehls | B01D 29/05 427/241 |
| 5,975,312 | A * | 11/1999 | Bonsan | B01D 29/90 210/453 |
| 6,533,072 | B2 * | 3/2003 | Hori | F16H 57/0404 184/6.25 |
| 6,691,511 | B1 * | 2/2004 | Phanco | B01D 35/0273 184/6.24 |
| 7,331,176 | B1 * | 2/2008 | Mizukawa | B60K 17/105 60/487 |
| 9,163,715 | B2 * | 10/2015 | Valente | F16H 48/06 |
| 9,944,229 | B2 * | 4/2018 | Kelly | F16H 57/0402 |
| 11,199,253 | B2 | 12/2021 | Trimmer et al. | |
| 2011/0309010 | A1 * | 12/2011 | Kuo | B01D 29/111 210/232 |
| 2020/0340534 | A1 * | 10/2020 | Yu | F16C 33/1055 |

FOREIGN PATENT DOCUMENTS

| | | | | |
|---|---|---|---|---|
| CN | 211995009 | U | 11/2020 | |
| CN | 213929384 | U | 8/2021 | |
| DE | 102015211338 | A1 * | 12/2016 | ............. B01D 33/23 |
| DE | 102020116398 | A1 * | 12/2021 | ......... B01D 46/0005 |
| JP | 2006043700 | A * | 2/2006 | ........... B01D 29/014 |

OTHER PUBLICATIONS

He Parts International Mining Solutions, "Birrana A6982 Diff/ Planetary Isolation Seal to Suit CAT 785 Truck," Sep. 2017, 1 Page.

\* cited by examiner

SCREEN ASSEMBLY

TECHNICAL FIELD

The present disclosure relates generally to axle assemblies and, for example, to a screen assembly for an axle assembly.

BACKGROUND

A conventional power train for vehicles, particularly for heavy industrial machinery such as that used in forestry, landfill operations, agriculture, mining, construction, material handling, tunneling, drilling, and other industries, often includes a power source that is operatively connected to driven traction members, such as the rear wheels of a wheeled machine, through an axle shaft connected to a final drive assembly of an axle assembly. The final drive assembly typically includes a gear set that is designed to alter the rotational speed and torque transmitted from the axle shaft to the traction members. In addition, the axle assembly may include bearings to facilitate rotation of the traction members and a differential that includes multiple gears. In some cases, one or more components of the axle assembly, such as gears, bearings, or the like, may wear or fail and create debris that can damage or interfere with other components of the axle assembly. For example, debris caused by wear or failure of a gear of the final drive assembly may damage or interfere with the differential.

China Patent No. 208842151 (the '151 patent) discloses a drive axle housing with an oil filter device to solve the problem of wear debris in gear oil damaging the normal operation of parts such as bearings and gears. While the '151 patent discloses filtering debris from oil, the oil filter device of the '151 patent does not prevent debris from traveling along a length of an axle assembly. For example, the oil filter device of the '151 patent is not located to prevent debris from traveling between an axle housing (e.g., that contains a differential) of an axle assembly and a spindle assembly of the axle assembly.

The screen assembly of the present disclosure solves one or more of the problems set forth above and/or other problems in the art.

SUMMARY

In some implementations, a screen assembly includes at least one plate member having at least one opening; a screen, that is fluid permeable, disposed on the at least one plate member to expose the screen via the at least one opening; an aperture through the at least one plate member and the screen to receive an axle shaft; a notch extending inwardly from an outer edge of the screen assembly to provide a passage for a fluid conduit; and at least one magnet disposed on the at least one plate member.

In some implementations, an axle assembly includes an axle housing; a spindle assembly connected to the axle housing; an axle shaft extending through the axle housing and the spindle assembly; a fluid conduit configured to transport lubricant; and a screen assembly including a screen. The screen assembly may partition an interior of the axle housing from an interior of the spindle assembly. The screen assembly may be configured to provide fluid communication between the interior of the axle housing and the interior of the spindle assembly via the screen. The fluid conduit may pass through a notch of the screen assembly that provides a passage from the interior of the axle housing to the interior of the spindle assembly. The axle shaft may extend through the axle housing and the spindle assembly via an aperture of the screen assembly.

In some implementations, a screen assembly includes a first plate member having a plurality of openings; a second plate member having a plurality of openings aligned with the plurality of openings of the first plate member; a screen, that is fluid permeable, disposed between the first plate member and the second plate member to expose the screen via the plurality of openings of the first plate member and the plurality of openings of the second plate member; an aperture through the first plate member, the second plate member, and the screen to receive an axle shaft; a notch extending inwardly from an outer edge of the screen assembly to provide a passage for a fluid conduit; and at least one magnet disposed on at least one of the first plate member or the second plate member.

DETAILED DESCRIPTION

This disclosure relates to a screen assembly, which is applicable to any machine that employs an axle assembly to drive traction members of the machine.

Figure 1:
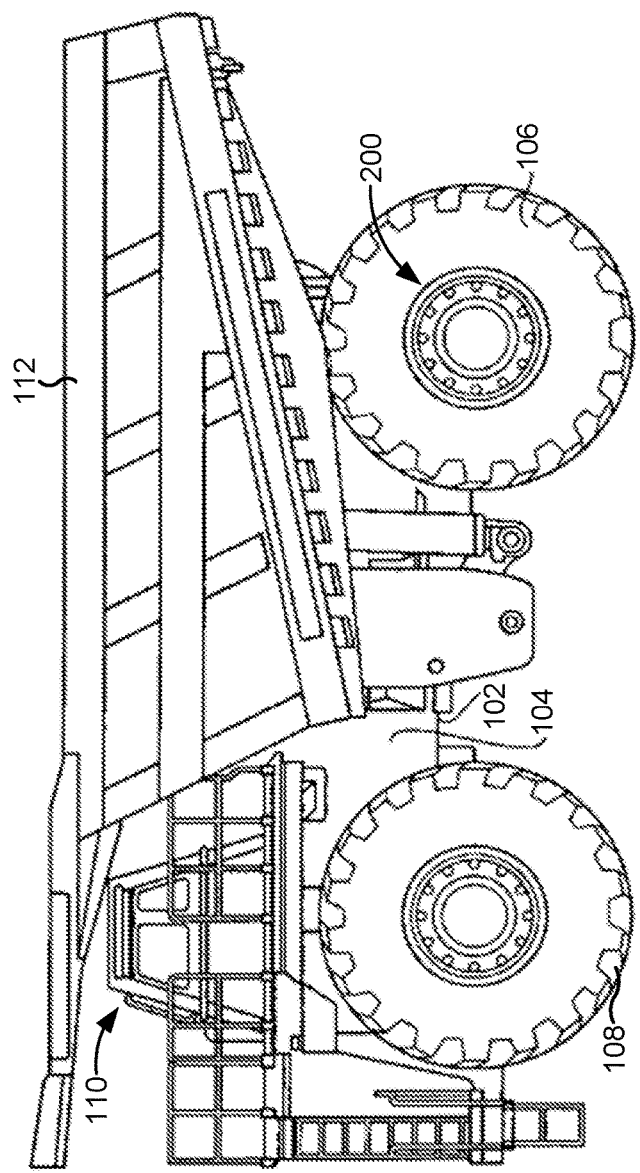
FIG. 1 shows an example machine.

FIG. 1 shows an example machine 100. The machine 100 may be an off-highway truck, as shown, or any other on- or off-highway machine that includes a propulsion system with an axle assembly. For example, the machine 100 may include a dump truck, a wheel loader, a motor grader, a dozer, an excavator, a water truck, an articulated truck, or other similar heavy mobile equipment.

As shown, the machine 100 includes a frame 102 that supports a power source 104 operatively coupled for propulsion to rear wheels 106. Front wheels 108 are operable for front-wheel steering, and in some examples, may also be driven. The frame 102 also supports an operator station 110 that includes operator controls, displays, and/or other components used for control of the machine 100 during operations.

The power source 104 of the machine 100 may include an engine, such as, for example, a diesel engine, a gasoline engine, a gaseous fuel powered engine such as a natural gas engine, or any other type of engine. The power source may alternatively include a non-combustion source of power such as a fuel cell, a power storage device, an electric motor, or similar mechanism. A power train of the machine 100 may include the power source 104 operatively coupled through, for example, a transmission that is mechanically connected through an output shaft to a rear differential. In an alternative implementation, the machine 100 may include an electric drive propulsion system that includes an alternator, generator, or other components configured to convert mechanical energy from the power source into electrical energy that is transferred to one or more electric drive motors for machine propulsion. The rear wheels 106 of the machine 100 are supported for rotation and operatively connected to the power train through an axle assembly 200, described further in connection with FIG. 2.

In an implementation associated with a dump truck, as shown, the machine 100 may include a truck body 112 for hauling material. In other embodiments of the machine 100, the machine 100 may include a work implement, such as a bucket assembly.

As indicated above, FIG. 1 is provided as an example. Other examples may differ from what is described in connection with FIG. 1.

Figure 2:
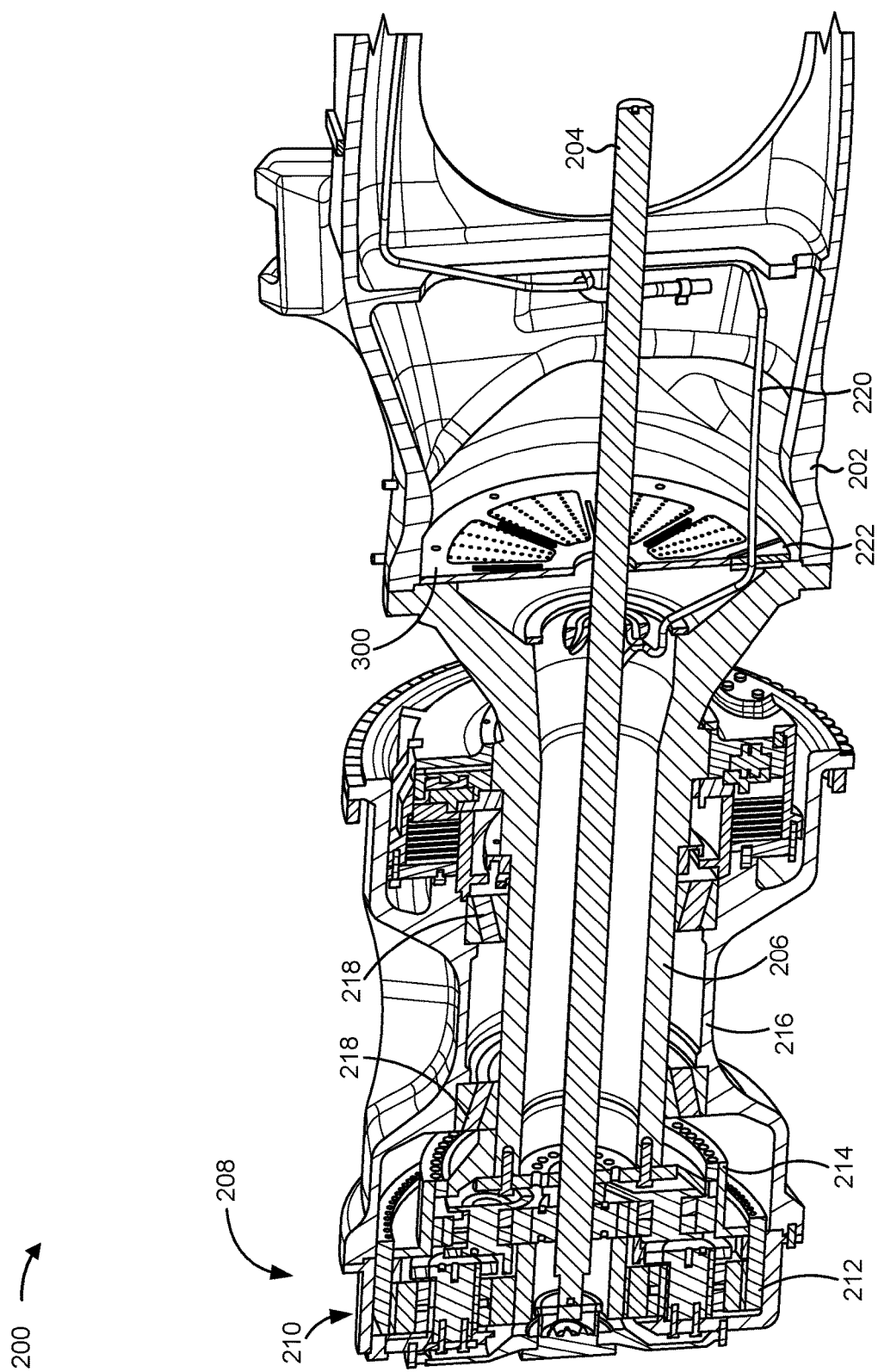
FIG. 2 shows a cross-sectional view of an example axle assembly.

FIG. 2 shows a cross-sectional view of the example axle assembly 200. The axle assembly 200 may correspond to a rear axle assembly, as indicated in FIG. 1, and/or may correspond to a front axle assembly. The axle assembly 200 is attached to the frame 102 of the machine 100, and may support wheels, such as the rear wheels 106 shown in FIG. 1.

The axle assembly 200 includes an axle housing 202 that may include attachment members (e.g., fasteners) to the frame 102. A differential (not shown) may be disposed within the axle housing 202 and operatively connected to an axle shaft 204 (e.g., to thereby drive the axle shaft 204). Alternatively, a set of electric drive motors (not shown) may be disposed within the axle housing 202, and an electric drive motor may be operatively connected to the axle shaft 204 (e.g., to thereby drive the axle shaft 204). The axle shaft 204 extends through the axle housing 202, and a spindle assembly 206 connected to the axle housing 202, to drive a final drive assembly 208, or final drive planetary gear set. The final drive assembly 208 may, for example, include a double reduction planetary gear set 210, which includes a first reduction planetary gear set 212 and a second reduction planetary gear set 214.

The final drive assembly 208 (e.g., the second reduction planetary gear set 214) is configured to rotate a wheel assembly 216. The wheel assembly 216 is positioned between the axle housing 202 and the final drive assembly 208, and is configured to support wheels, such as the rear wheels 106 of FIG. 1. The wheel assembly 216 may be configured to support one wheel or, alternatively, a pair of wheels. The wheel assembly 216 is rotatably supported on the spindle assembly 206. For example, the wheel assembly 216 may be rotatably mounted on the spindle assembly 206 using wheel or roller bearings 218.

The axle assembly 200 may include at least one fluid conduit 220 of a lubrication system. The fluid conduit 220 may be a supply line or a suction line. For example, the fluid conduit 220 may be configured to transport a lubricant (e.g., oil) through the axle housing 202 to the spindle assembly 206. The fluid conduit 220 may be configured to discharge the lubricant in an interior of the spindle assembly 206, for example, to provide lubrication to the axle shaft 204, the final drive assembly 208, and/or the wheel assembly 216. The fluid conduit 220 may be retained in a retaining element 222 of the axle assembly 200.

The axle assembly 200 may include a screen assembly 300. The screen assembly 300 may be located between the axle housing 202 and the spindle assembly 206. For example, the screen assembly 300 may be connected to (e.g., by one or more fasteners) an end of the spindle assembly 206 that interfaces with the axle housing 202. The screen assembly 300 may partition an interior of the axle housing 202 from an interior of the spindle assembly 206, and the screen assembly 300 may be configured to provide fluid communication between the interior of the axle housing 202 and the interior of the spindle assembly 206 via a screen of the screen assembly 300, described further in connection with FIG. 3. Moreover, the screen assembly 300 permits lubricant to flow between the spindle assembly 206 and the axle housing 202 to facilitate lubricant filtration and cooling. Accordingly, the screen assembly 300 prevents debris, such as debris resulting from wear or failure of a component (e.g., a bearing, a gear, or the like), from passing between the spindle assembly 206 and the axle housing 202 and affecting or damaging other components (since the lubricant flows from the spindle assembly 206 toward the axle housing 202, such debris could be carried along by the flowing lubricant, but it is also possible that debris in the axle housing 202 could move to spindle assembly 206).

As indicated above, FIG. 2 is provided as an example. Other examples may differ from what is described in connection with FIG. 2.

Figure 3:
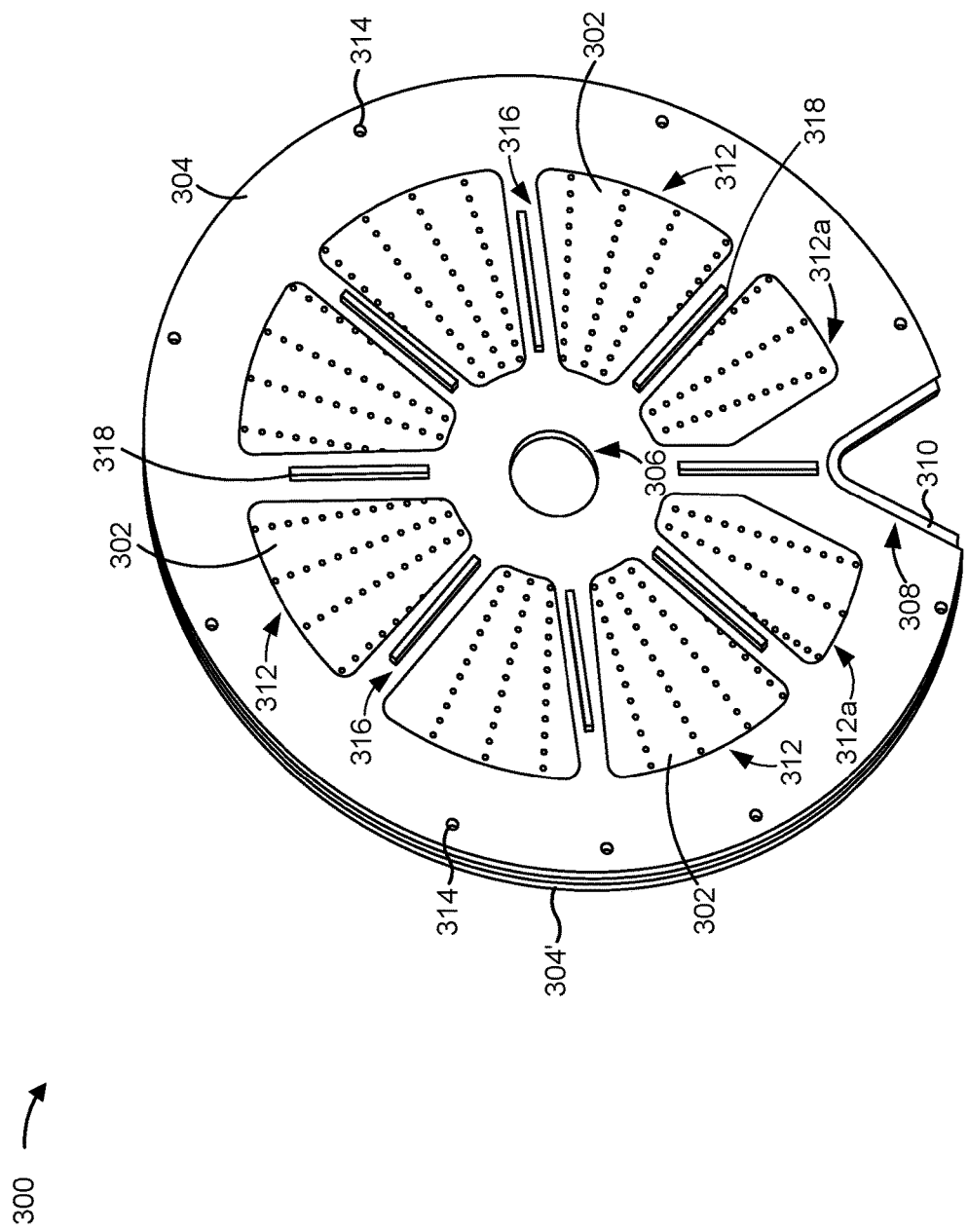
FIG. 3 shows an example screen assembly.

FIG. 3 shows an example of the screen assembly 300. The screen assembly 300 may include a screen 302. The screen 302 may be fluid permeable. That is, the screen 302 may be configured to allow a fluid, such as a lubricant (e.g., oil), to pass through the screen. However, the screen 302 may be configured to prevent solid particles that are greater than a threshold size to pass through the screen. In some implementations, the screen 302 may be a perforated plate. That is, the screen 302 may include a plate (e.g., a steel plate) with a plurality of perforations. In some implementations, the screen 302 may include a mesh material or another woven material.

The screen assembly 300 may include at least one plate member 304. For example, the screen assembly 300 may include a first plate member 304 and a second plate member 304' (which may be on an opposite side of the screen assembly 300 from the first plate member 304). The screen 302 may be disposed on a plate member 304. For example, the screen 302 may be disposed between the first plate member 304 and the second plate member 304'. The plate member(s) 304 provide structural support for the screen 302. The plate member(s) 304 may be fluid impermeable. As shown, the screen assembly 300, including the screen 302 and the plate member(s) 304, may have an overall disc shape. However, other shapes (e.g., a polygonal shape) may be used for the screen assembly 300.

The screen assembly 300 may include an aperture 306 through the plate member(s) 304 and the screen 302. The aperture 306 may be located at a center of the screen assembly 300 (e.g., at centers of the screen 302 and the plate member(s) 304). The aperture 306 may be configured to receive the axle shaft 204. In some implementations, a gasket (not shown) may border the screen assembly 300 about the aperture 306 to provide a fluid seal at an interface of the screen assembly 300 and the axle shaft 204 received in the aperture 306.

The screen assembly 300 may include a notch 308. For example, the notch 308 may be in the plate member(s) 304 or in the screen 302 and in the plate member(s) 304, depending on a diameter of the screen 302 relative to a diameter of the plate member(s) 304. The notch 308 may provide a passage for the fluid conduit 220 from an interior of the axle housing 202 to an interior of the spindle assembly 206. For example, the fluid conduit 220 may pass through the notch 308 from an interior of the axle housing 202 to an interior of the spindle assembly 206.

The notch 308 may extend inwardly (e.g., toward the aperture 306) from an outer edge of the screen assembly 300. That is, the outer edge of the screen assembly 300 may be notched. The notch 308 may be configured to mate with the retaining element 222 for the fluid conduit 220. That is, the notch 308 may be configured to fit against the retaining element 222 to provide a fluid seal at an interface of the screen assembly 300 and the retaining element 222. In some implementations, the screen assembly 300 may further include a gasket 310 that borders the screen assembly 300 about the notch 308 to provide the fluid seal at the interface of the screen assembly 300 and the retaining element 222. The notch 308 may taper from the outer edge of the screen assembly 300 inwardly toward the aperture 306. For example, the notch 308 may be approximately triangular in shape (and the retaining element 222 likewise may be triangular in shape). While the notch 308 is described herein as being triangular, the notch 308 may be another shape, such as circular, rectangular, or the like (and the retaining element 222 may have a corresponding shape).

A plate member 304 may include at least one opening 312 to expose a portion of the screen 302. For example, the plate member 304 may include a plurality of openings 312 to expose portions of the screen 302. The opening(s) 312 may be located inward from an outer edge of the plate member 304. For example, the opening(s) 312 may be entirely in an interior of the plate member 304 (e.g., the opening(s) 312 may not extend to the outer edge of the plate member 304 or to the aperture 306). As shown, the plurality of openings 312 may be arranged radially around the aperture 306. Moreover, the plurality of openings 312 may be located (e.g., distanced from an outer edge of the plate member 304 in an interior of the plate member 304) to define an edge region of the plate member 304 that includes one or more mounting holes 314. The mounting holes 314 may be configured to receive mounting hardware (e.g., bolts) to mount the screen assembly 300 in the axle assembly 200, as described above.

The plurality of openings 312, arranged radially around the aperture 306, may be sized and shaped to define a plurality of spokes 316 in the plate member 304 (e.g., the spokes 316 are thin strips of the plate member 304 located between the openings 312). For example, the openings 312, located a distance from an outer edge of the plate member 304, may extend inwardly and taper toward the aperture 306. As an example, the openings 312 may be approximately triangular in shape (however, as described below, one or more of the openings 312 may not be triangular in shape). Accordingly, the plate member 304 may have an overall shape that resembles a spoked wheel, as shown. While the openings 312 are described herein as being triangular, the openings 312 may be another shape, such as circular, rectangular, or the like. As plurality of openings 312 are surrounded by an outer edge of the plate member 304 and are separated by spokes 316, a stiff and strong screen assembly 300 can be achieved.

In some implementations, one or more openings 312a adjacent to the notch 308 may be sized and/or shaped differently than the remaining openings 312. That is, the plurality of openings 312 may include one or more first openings 312a that have a different size and/or shape than a size and/or shape of one or more second openings 312 of the plurality of openings 312. For example, as shown, each of the openings 312a adjacent to the notch 308 may have smaller opening areas than opening areas of each of the remaining openings 312. As an example, the openings 312a adjacent to the notch 308 may be in the shape of truncated triangles (e.g., truncated versions of the approximately triangular shape of the remaining openings 312).

The plate member 304, described above, may correspond to each of the first plate member 304 and the second plate member 304'. In other words, the first plate member 304 and the second plate member 304' may be configured similarly. Moreover, features of the first plate member 304 and features of the second plate member 304' may be aligned, such that a first side of the screen assembly 300 and a second side of the screen assembly 300 are uniform. For example, openings 312 of the first plate member 304 may be aligned with openings 312 of the second plate member 304' (e.g., to enable fluid to flow through the screen 302 from the first side of the screen assembly 300 to the second side of the screen assembly 300).

The screen assembly 300 may include at least one magnet 318 (e.g., a permanent magnet) disposed on a plate member 304. The magnet 318 may be elongated in shape (e.g., in a bar shape). The magnet 318 may be disposed along a spoke 316 of the plate member 304. In this way, the magnet 318 may attract and remove ferrous debris from the axle assembly 200 (e.g., from lubricant within the axle assembly 200). In some implementations, the screen assembly 300 may include a plurality of magnets 318 disposed on the first plate member 304 and/or the second plate member 304'. For example, a first plurality of magnets 318 may be disposed on the first plate member 304 and a second plurality of magnets 318 may be disposed on the second plate member 304'. The first plurality of magnets 318 may be disposed respectively along the plurality of spokes 316 of the first plate member 304 (e.g., a respective magnet 318 may be disposed along each of the spokes 316) and/or the second plurality of magnets 318 may be disposed respectively along the plurality of spokes 316 of the second plate member 304'.

INDUSTRIAL APPLICABILITY

The screen assembly described herein can be used with any machine that uses an axle assembly to drive traction members (e.g., wheels) of the machine. For example, the screen assembly can be used with a machine that uses an axle assembly that includes an axle housing and a spindle assembly that are in fluid communication. In particular, the screen assembly is useful for preventing debris resulting from wear or failure of a component in the axle assembly from damaging or interfering with other components, or for mitigating such damage or interference. For example, the screen assembly may provide a barrier between an interior of the axle housing and an interior of the spindle assembly that prevents debris from passing between the interior of the axle housing and the interior of the spindle assembly. Moreover, the screen assembly may include magnets that collect and retain such debris. Accordingly, debris resulting from wear or failure of a component in the spindle assembly will not reach components in the axle housing, and vice versa. In this way, damage and debris contamination is contained and limited, thereby avoiding widespread damage and debris contamination in the axle assembly.

In addition, a screen of the screen assembly provides fluid communication between the interior of the axle housing and the interior of the spindle assembly. Accordingly, lubrication within the axle assembly may pass through the screen assembly for filtration and cooling. In this way, the screen assembly provides the benefits of a barrier between the interior of the axle housing and the interior of the spindle assembly without impeding or preventing the use of a lubrication system in the axle assembly.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A screen assembly, comprising:
   at least one plate member having at least one opening;
   a screen, that is fluid permeable, disposed on the at least one plate member to expose the screen via the at least one opening;
   an aperture through the at least one plate member and the screen to receive an axle shaft;
   a notch extending inwardly from an outer edge of the screen assembly to provide a passage for a fluid conduit;
   a retaining element configured to retain the fluid conduit and mate with the notch; and
   at least one magnet disposed on the at least one plate member.

2. The screen assembly of claim 1, wherein the at least one plate member comprises a first plate member and a second plate member, and
   wherein the screen is disposed between the first plate member and the second plate member.

3. The screen assembly of claim 1, wherein the screen comprises a perforated plate.

4. The screen assembly of claim 1, wherein the aperture is located at a center of the screen assembly, and
   wherein the at least one opening comprises a plurality of openings arranged radially around the aperture.

5. The screen assembly of claim 1, wherein the aperture is located at a center of the screen assembly, and
   wherein the at least one opening comprises a plurality of openings arranged radially around the aperture to define a plurality of spokes in the at least one plate member.

6. The screen assembly of claim 5, wherein at least one magnet is disposed along one of the plurality of spokes.

7. The screen assembly of claim 6, wherein the at least one magnet comprises a plurality of magnets, with one of the plurality of magnets disposed along each of the plurality of spokes.

8. The screen assembly of claim 1, wherein the notch tapers from the outer edge of the screen assembly inwardly toward the aperture.

9. An axle assembly, comprising:
   an axle housing;
   a spindle assembly connected to the axle housing;
   an axle shaft extending through the axle housing and the spindle assembly;
   a fluid conduit configured to transport lubricant; and
   a screen assembly including a screen,
   the screen assembly partitioning an interior of the axle housing from an interior of the spindle assembly,
   the screen assembly configured to provide fluid communication between the interior of the axle housing and the interior of the spindle assembly via the screen,
   the fluid conduit passing through a notch of the screen assembly that provides a passage from the interior of the axle housing to the interior of the spindle assembly, and
   the axle shaft extending through the axle housing and the spindle assembly via an aperture of the screen assembly.

10. The axle assembly of claim 9, wherein the axle housing contains a differential connected to the axle shaft.

11. The axle assembly of claim 9, further comprising:
    a retaining element configured to retain the fluid conduit, wherein the retaining element mates with the notch of the screen assembly.

12. The axle assembly of claim 9, wherein the screen assembly further includes at least one plate member having at least one opening, and
    wherein the screen is disposed on the at least one plate member to expose the screen via the at least one opening.

13. The axle assembly of claim 12, wherein the at least one opening comprises a plurality of openings arranged radially around the aperture.

14. The axle assembly of claim 12, wherein the at least one opening comprises a plurality of openings arranged radially around the aperture to define a plurality of spokes in the at least one plate member.

15. The axle assembly of claim 9, wherein the screen assembly further includes at least one magnet.

16. A screen assembly, comprising:
    a first plate member having a plurality of openings;
    a second plate member having a plurality of openings aligned with the plurality of openings of the first plate member;
    a screen, that is fluid permeable, disposed between the first plate member and the second plate member to expose the screen via the plurality of openings of the first plate member and the plurality of openings of the second plate member;
    an aperture through the first plate member, the second plate member, and the screen to receive an axle shaft;
    a notch extending inwardly from an outer edge of the screen assembly to provide a passage for a fluid conduit; and
    at least one magnet disposed on at least one of the first plate member or the second plate member.

17. The screen assembly of claim 16, wherein the aperture is located at a center of the screen assembly,
    wherein the plurality of openings of the first plate member are arranged radially around the aperture and the plurality of openings of the second plate member are arranged radially around the aperture.

18. The screen assembly of claim 16, wherein the aperture is located at a center of the screen assembly, and
    wherein the plurality of openings of the first plate member are arranged radially around the aperture to define a plurality of spokes in the first plate member and the plurality of openings of the second plate member are arranged radially around the aperture to define a plurality of spokes in the second plate member.

19. The screen assembly of claim 18, wherein the at least one magnet comprises a first plurality of magnets disposed along respective said spokes of the first plate member and a second plurality of magnets disposed respectively along said spokes of the second plate member.

20. The screen assembly of claim 18, further comprising: a gasket that borders the screen assembly about the notch.

\* \* \* \* \*